(12) United States Patent
Haatainen

(10) Patent No.: US 8,930,006 B2
(45) Date of Patent: Jan. 6, 2015

(54) DATA TRANSFER METHOD AND SYSTEM FOR LOUDSPEAKERS IN A DIGITAL SOUND REPRODUCTION SYSTEM

(71) Applicant: Genelec Oy, Iisalmi (FI)

(72) Inventor: Niko Haatainen, Iisalmi (FI)

(73) Assignee: Genelec Oy, Iisalmi (FI)

( * ) Notice: Subject to any disclaimer, the term of this patent is extended or adjusted under 35 U.S.C. 154(b) by 0 days.

(21) Appl. No.: 13/922,281

(22) Filed: Jun. 20, 2013

(65) Prior Publication Data

US 2013/0336498 A1 Dec. 19, 2013

Related U.S. Application Data

(63) Continuation of application No. 12/922,078, filed as application No. PCT/EP2008/052917 on Mar. 12, 2008, now abandoned.

(51) Int. Cl.
*G06F 17/00* (2006.01)
*H04R 3/12* (2006.01)
*H04J 3/06* (2006.01)
*H04R 27/00* (2006.01)

(52) U.S. Cl.
CPC ............... *H04R 3/12* (2013.01); *H04J 3/0667* (2013.01); *H04R 27/00* (2013.01); *H04R 2227/003* (2013.01); *H04R 2227/005* (2013.01)
USPC ......................................................... 700/94

(58) Field of Classification Search
USPC ......................................................... 700/94
See application file for complete search history.

(56) References Cited

U.S. PATENT DOCUMENTS 7,668,964 B2  2/2010  Millington
7,742,832 B1  6/2010  Feldman (Continued)

FOREIGN PATENT DOCUMENTS

CN  1842755 A  10/2006
CN  1890905 A  1/2007

(Continued)

OTHER PUBLICATIONS

Blum P et al.: "Trace-based evaluation of clock synchronization algorithms for wireless loudspeakers", Sep. 6, 2004.

(Continued)

*Primary Examiner* — Paul McCord
(74) *Attorney, Agent, or Firm* — Seppo Laine Oy; Joshua P. Wert

(57) ABSTRACT

The present publication describes a data transfer method and system in a digital sound reproduction system. The method comprises method steps for generating a digital audio stream for multiple channels in a host data source, e.g. a computer, the audio stream is formed by multiple consecutive samples, receiving the digital audio stream sent by the host data source through a digital data transmission network by several digital receivers each of which including a microcontroller with a clock, the receivers further including means for generating an audio signal. In accordance with the invention the host data source sends repeatedly a synchronization sample to at least one receiver, the receiver replies to the synchronization sample by a return sample, the host calculates a latency (T) for each receiver based on the sending time ($Th_1$) of the synchronization sample and the reception time ($Th_2$) of the return sample and the processing time ($Tt_1$-$Tt_2$) of the receiver, the host sends to the receiver information of the calculated latency (T) in combination with the time stamp the measurement time, based on this information the receiver adjusts the function of its clock, and the above synchronization steps are repeated continuously.

13 Claims, 7 Drawing Sheets

(56) References Cited

U.S. PATENT DOCUMENTS

| | | |
|---|---|---|
| 7,912,094 B2 | 3/2011 | Hall et al. |
| 2004/0005902 A1 | 1/2004 | Belcea |
| 2004/0223622 A1 | 11/2004 | Lindemann et al. |
| 2005/0138455 A1 | 6/2005 | Loukianov et al. |
| 2005/0190928 A1* | 9/2005 | Noto .................. 381/77 |
| 2005/0234571 A1 | 10/2005 | Holmes |
| 2005/0276255 A1* | 12/2005 | Aiello et al. .................. 370/348 |
| 2005/0288805 A1 | 12/2005 | Moore |
| 2006/0184261 A1 | 8/2006 | Ng et al. |
| 2006/0280182 A1* | 12/2006 | Williams et al. .............. 370/394 |
| 2007/0100473 A1 | 5/2007 | Shvodian et al. |
| 2007/0140510 A1 | 6/2007 | Redmann |
| 2007/0226530 A1* | 9/2007 | Celinski et al. ............... 713/500 |
| 2008/0031283 A1 | 2/2008 | Curran-Gray et al. |
| 2008/0056154 A1 | 3/2008 | Firestone et al. |
| 2008/0291891 A1 | 11/2008 | Jerlhagen et al. |

FOREIGN PATENT DOCUMENTS

| | | |
|---|---|---|
| JP | H11118961 A | 4/1999 |
| JP | 2005253033 A | 9/2005 |
| JP | 2006237918 A | 9/2006 |

OTHER PUBLICATIONS

Mills D L: "Internet time synchronization: The network time protocol", Oct. 1, 1991.

* cited by examiner

DATA TRANSFER METHOD AND SYSTEM FOR LOUDSPEAKERS IN A DIGITAL SOUND REPRODUCTION SYSTEM

FIELD OF INVENTION

The present invention relates to a data transfer method according to the preamble of Claim 1.

The invention also relates to a data transfer system.

BACKGROUND OF INVENTION

According to the prior art, there are several commercial system for digital audio reproduction in digital networks. For example following products are available today. The Gibson MaGIC™ network Cobra Net™, EtherSound™, Livewire™, MADI™ and others describe systems by which audio data may be streamed to digital loudspeakers or sound reproduction systems. Basically the quality of the reproduction in these systems is very good for home use but for professional use the digital transfer technology causes some problems.

In accordance with the prior art the above problem has been solved by buffering the information into receivers and controlling the unloading of the information from the receivers.

In more detail, to synchronize clocks over Ethernet connections the exact travel time of network packets must be measured. This is difficult for two reasons. First, standard network socket API will introduce random latency between calling the user-mode send-function and the actual output of the packet depending on the status of the operating system. The same applies also to reception of packets, the time between reception of packet from the network and its indication to user-mode process listening to the UDP socket cannot be accurately determined.

Secondly, when packet travels through network it will go through one or more hubs, switches or routers. Each device may randomly delay packets depending on the load of network and state of the device. This introduces random latency in travel time that cannot be predicted. When measured, it is found that the latency is nearly constant for most of the packets but some packets may be delayed by several hundreds of microseconds or even more.

SUMMARY OF INVENTION

The invention is intended to eliminate some defects of the state of the art disclosed above and for this purpose create an entirely new type of method and apparatus for data transfer in a sound reproduction system.

The invention is based on implementing network packet time stamping in network protocol stack so that accurate time for send and receipt of packets can be determined. In a preferred embodiment the receiver software implements the time stamping directly in the Ethernet driver (for which we have source code) for the most accurate operation possible.

The second problem is preferably solved simply by running the clock synchronization, which includes determination of round-trip time between host and receiver, and performing the synchronization only if the latency is within acceptable range from measured minimum latency.

More specifically, the method according to the invention is characterized by what is stated in the characterizing portion of Claim 1.

The system according to the invention is, in turn, characterized by what is stated in the characterizing portion of Claim 6.

Considerable advantages are gained with the aid of the invention.

The present invention is especially suitable for multi channel sound reproduction systems, where along the same data transfer path is sent a data stream including audio information of multiple audio channels to be reproduced simultaneously in several loudspeakers.

With the aid of the method according to the invention, a statistical latency time may be defined in a start-up procedure and use this value as a reference latency time for further, continuous latency measurement.

By these two methods the audio reproduction system may adapt to the load of the network and make suitable adjustments in order to maintain high quality and synchronized multi-channel audio reproduction in most of the load variation cases.

In the following, the invention is examined with the aid of examples and with reference to the accompanying drawings.

DETAILED DESCRIPTION OF EXEMPLARY EMBODIMENT

Figure 1:
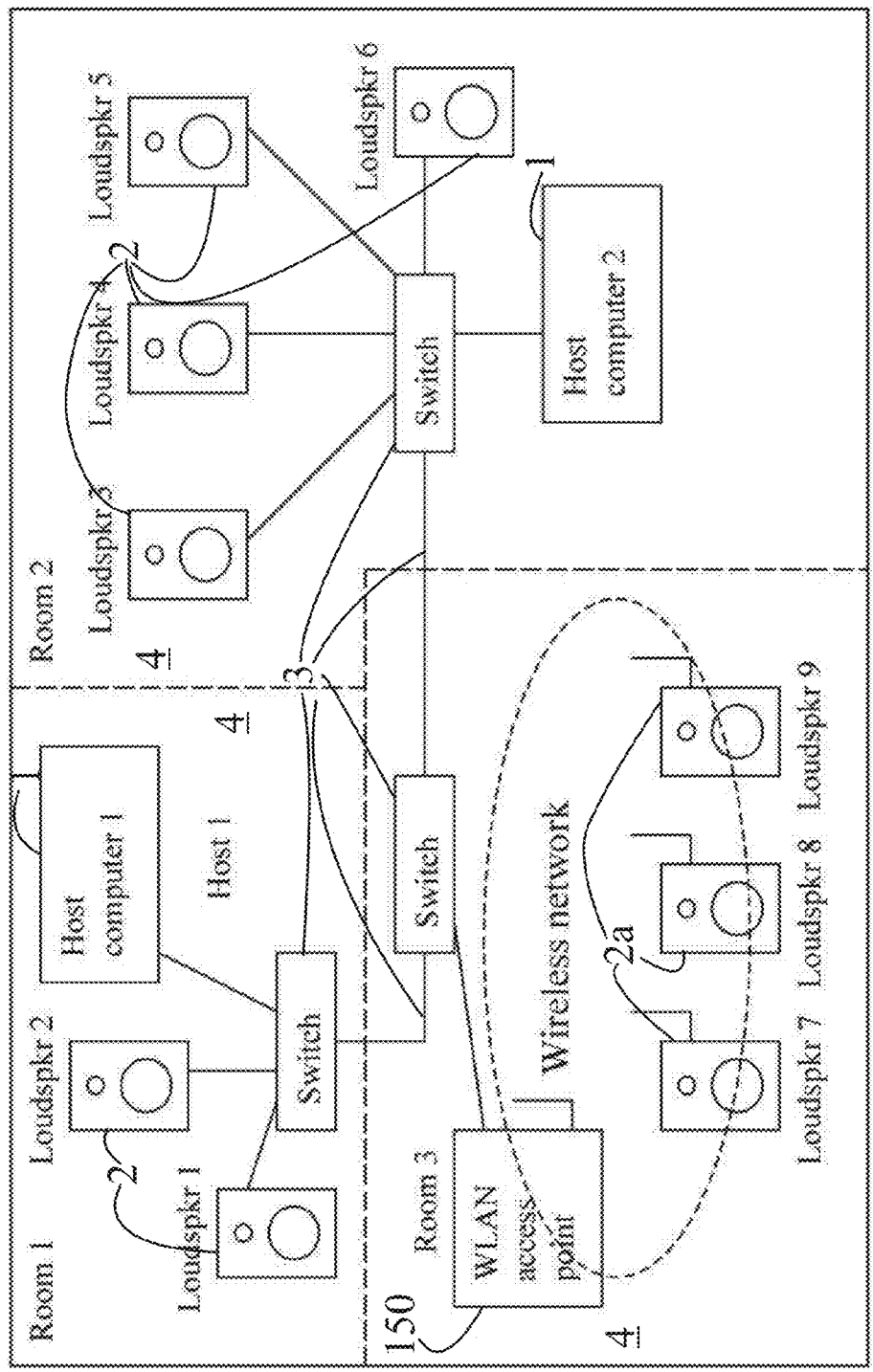
FIG. 1 shows a block diagram a digital audio system, which can be used in connection with the present invention.

In the invention, the following terminology is used in connection with the reference numbers. However, the list is not exhaustive especially relating to the block and flow diagrams of FIGS. 7-11:

1 host or host data source
2 receiver, digital loudspeaker,
2*a* wireless receiver
3 switch, network
4 group of receivers
10 hard disc
12 virtual software audio adapter (driver)
13 audio data manager
14 synchronization manager
15 network interface
16 network timestamping
17 system clock
20 network interface
22 timer hardware
23 adjustable oscillator
24 loudspeaker networks communications
25 synchronization controller
26 digital to analog conversion
27 audio stream controller
28 data output controller
29 sample rate converter
60 synchronization signal/ECHO REQ
61 Return message/ECHO RESP
62 Control Command/SET CLOCK

150 Wireless Local Area Network (WLAN) access point

Also the following acronyms and abbreviations are used in the following text.

DHCP Dynamic Host Configuration Protocol

FEC Forward Error Correction

GLM Genelec Loudspeaker Manager

Global LSNW address Multicast address:port to which all global LSNW traffic is sent. All receivers listen to this address to receive DISCOVERY, ANNOUNCE, GROUP and other global messages Group LSNW address Multicast address:port to which all data directect to set of grouped receivers is sent. All receivers that are assigned to same group listen to same group address. Group address will receive clock synchronization messages, streamed audio and glm control messages.

Host Application that manages the loudspeaker network, streams audio and send glm-control messages.

IP Internet Protocol

LSNW Loudspeaker Network

Multicast address A special IP address that will be routed to members of a multicast group.

Receiver Processor, network interface and the software that connects a loudspeaker to IP-network UDP User datagram protocol Further, in this application latency means the network delay between two network elements for a data sample.

In accordance with FIG. 1 the system in accordance with the invention comprises at least one host computer 1 or host data source for controlling the system and several receivers 1 connected to the host computers 1 via en digital network 3 comprising the signal path 3 formed by cables, connectors, network adapters and switches etc.

In other words the LSNW (Loudspeaker network) system consists of one or more hosts 1 that each manage sets of receiver devices 2. Hosts 1 act as source of management, control and audio data to the receivers 2. Hosts 1 are responsible for discovering receivers 2 connected to IP-network, managing groups 4 of receivers and providing them with audio. Receivers 2 respond to commands and playback audio data from hosts 1.

Figure 2:
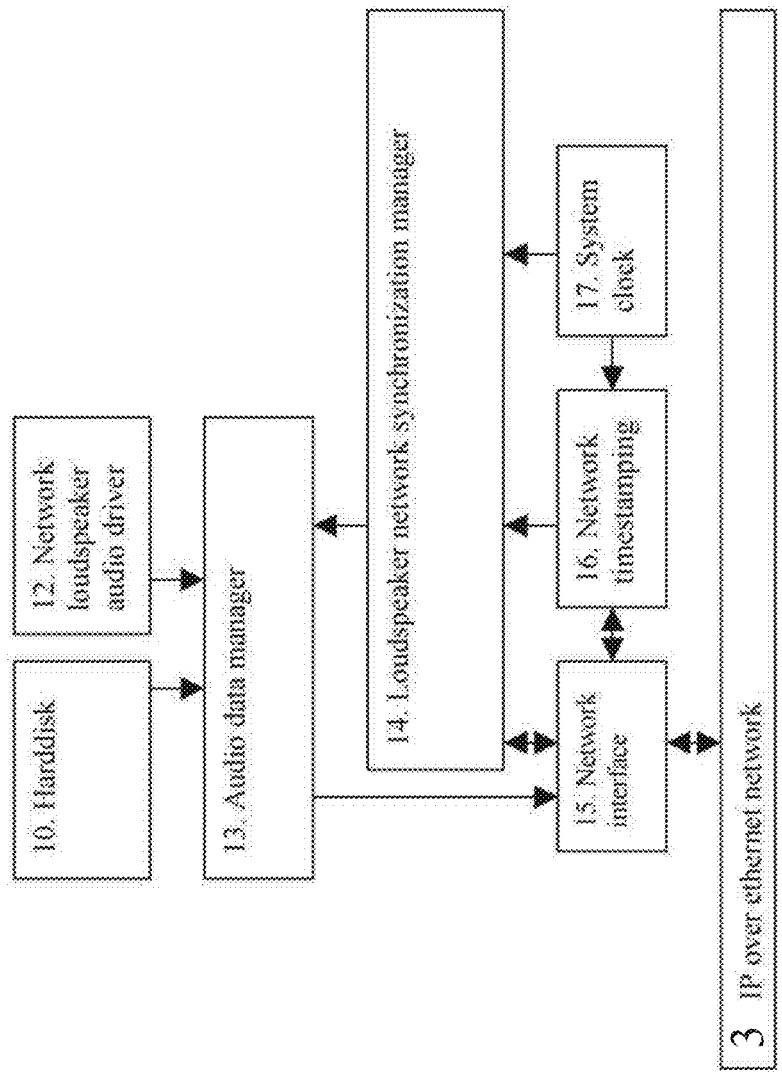
FIG. 2 shows as a block diagram one network management host system in accordance with the invention.
Figure 3:
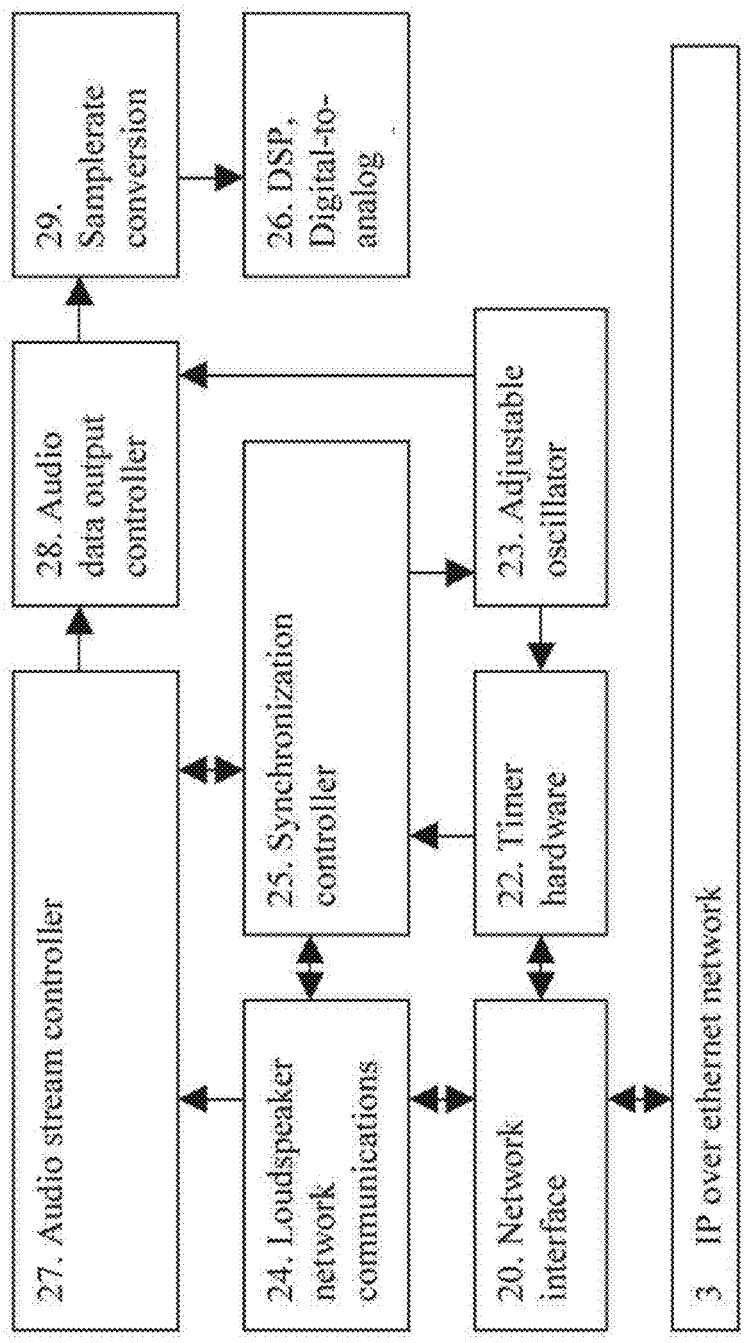
FIG. 3 shows as a block diagram one receiver management system according to the invention.

In accordance with FIG. 2 the host system comprises typically hard disc 10 by which Digital audio data may be stored. Also some other non-volatile medium like flash memory can be used. Digital audio data may be acquired from virtual software audio adapter (driver) 12 that redirects audio to networked loudspeakers. Audio data manager 13 acquires digital audio data and makes it suitable for streaming. Streaming and synchronization manager 14 controls clock synchronization of loudspeaker devices (receivers) currently controlled by the host. Network interface 15 connects the host to computer communications network. Network timestamp-module 16 manages accurate timing of synchronization related network traffic. This is required to reduce effects of random latencies introduced by the non real-time operating system (such as Windows, Linux etc.) run by the host. System clock 17 provides accurate time information used by the synchronization manager and a standard Ethernet network 3 enables IP-based communications between the host and the receivers.

Host application manages the loudspeaker network, routes management information from GLM and audio from audio software to receivers. Host application will run as a background daemon process on the host computer. On windows platform, these background processes are usually referred as services or system services.

Host provides interface for GLM software to send and receive GLM-messages to receivers as if the GLM Software was using GLM network.

Host software will provide standard audio interface for audio software to send audio to LSNW receivers. Such interfaces are for example ASIO and Windows audio. The audio software will see LSNW receivers as channels in virtual audio interface provided by the host.

Host will include proprietary kernel-mode driver software to provide necessary virtual audio interface and UDP Network interface 20 connects the receiver to communications network 3. Timer hardware 22 provides time information for the system clock and synchronization controller. Adjustable oscillator 23 provides clock signal for timer hardware and audio data output controller 28. Loudspeaker networks communications module 24 manages network traffic to and from host computer. Synchronization controller 25 synchronizer receivers clock with host. It adjusts clock oscillator in order to minimize clock drift between receiver and host clocks. Digital signal processing, digital-to-analog conversion takes place in block 26. Audio stream controller 27 manages audio data received from host and feeds it to audio data output controller 28. Audio data output controller 28 outputs audio data at rate specified by adjustable oscillator 23. This guarantees that samples will be output at same rate as host outputs them. Sample rate converter 29 converts digital audio to internal sample rate used by digital signal processing and digital-to-analog conversion.

Accurate clock synchronization is essential for correct working of the LSNW. The LSNW protocol has mechanism for clock synchronization that enables synchronization of host and receiver clock within accuracy of about 10-20 microseconds.

The solution to the travel time (latency) measurement is to implement network packet time stamping in network protocol stack so that accurate time for send and receipt of packets can be determined. In windows host software the time stamping is implemented as an IP Packet Filter that examines incoming and outgoing UDP-packets and record time stamps if packet is destined to or originates from an LSNW receiver. This location is not optimal for time stamping, as the time stamps should be collected as near the network hardware as possible, but experience shows that time stamping at the IP Packet Filter lever gives good accuracy.

The receiver software in accordance with the invention implements the time stamping directly in the Ethernet driver for the most accurate operation possible. For this purpose a source code has been developed in connection with the invention.

The problem of random variation of network latency can be solved simply by running the clock synchronization, which includes determination of round-trip time between host and receiver, and performing the synchronization only if the latency is within acceptable range from measured minimum latency.

Figure 4:
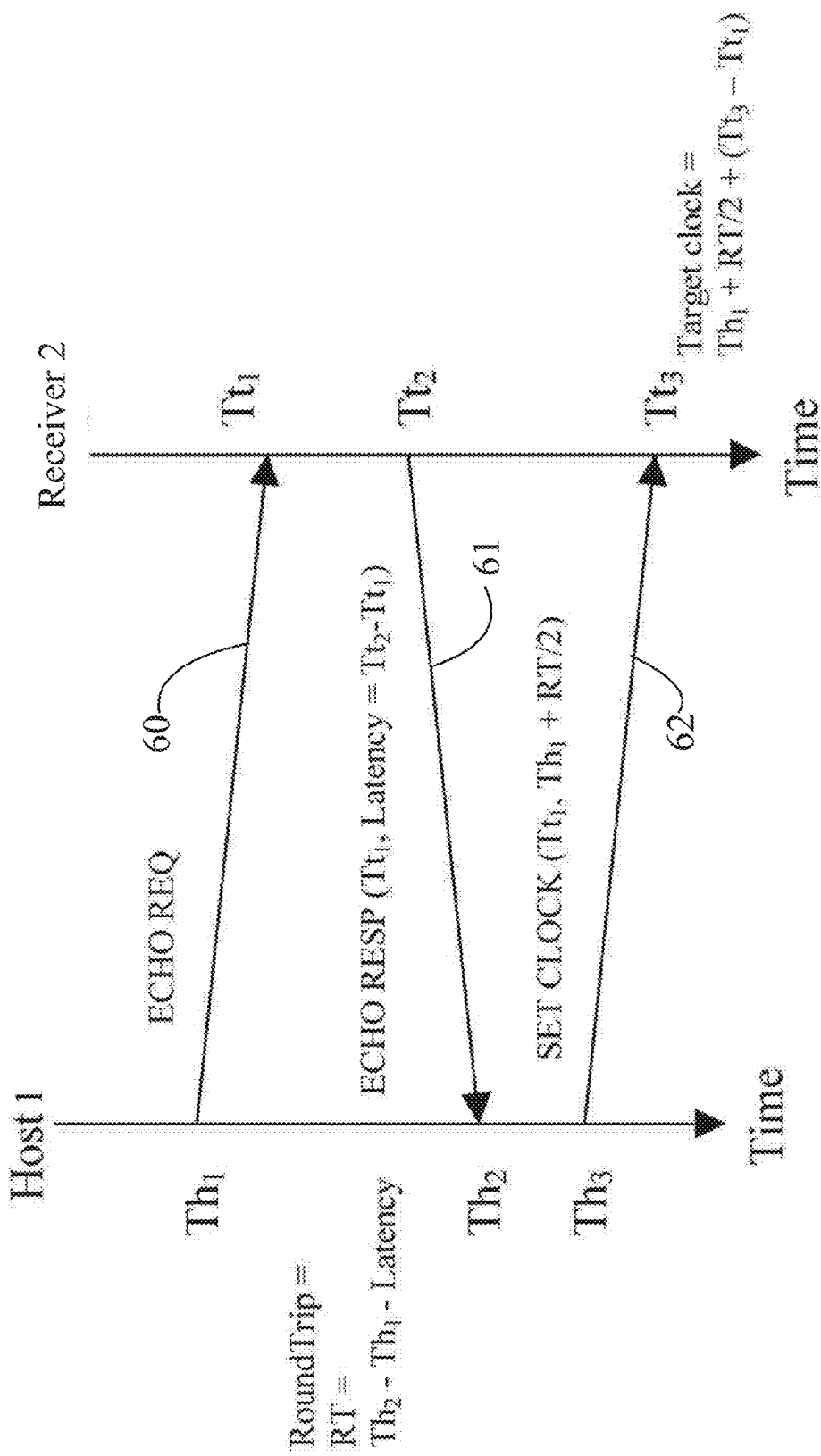
FIG. 4 shows as a timing diagram a method in accordance with the invention.

Clock synchronization is initiated by the host in accordance with FIG. 4. The host 1 will synchronize clocks with each group member in a round-robin fashion to guarantee all receivers have accurate time. A receiver may send SYNCH REQUEST message to host if it feels a need to resynchronize its clock. This can happen for example if receiver must interrupt audio stream due to packet loss and continues it when audio packets are received.

When a receiver 2 is assigned to a group, the host will send several ECHO REQ packets 60 to receiver to probe the roundtrip latency. The receiver 2 will reply with ECHO RESP 61 and the host 1 will then determine roundtrip latency $Tt_1$-

$Tt_2$ for each transaction. Once the roundtrip latency $Tt_1$-$Tt_2$ is determined with adequate accuracy, the host 1 will set the minimum acceptable roundtrip for successful synchronization. The latency will also change as the function of packet size, so the latency is probed for packets of different sizes.

The actual roundtrip latency is measured as follows:
1. Send ECHO REQ 60 to receiver 2 (add extra payload to increase packet size if necessary, receiver will not process the extra payload as it is used only to change actual UDP datagram size to determine latency for different packet sizes)
2. Get timestamp TSsend ($Th_1$) for the packet containing ECHO REQ 60 from timestamp driver
3. Receive ECHO RESP 61 from the receiver, it will contain receiver ProcessingLatency, which is amount of microseconds receiver spent between receipt of the ECHO REQ 60 and sending of ECHO RESP 61
4. Get timestamp TSrecv ($Th_2$) for the ECHO RESP 61 packet. Timestamp is formed by the Host 1
5. Roundtrip latency is TSrecv—TSsend—ProcessingLatency Actual clock synchronization starts like the request—response transaction in initialization phase. Host sends an ECHO REQ 61 and receiver replies with ECHO RESP 61.

ECHO RESP 61 packet contains two values, receivers clock at the time $Tt_1$ of receipt of ECHO REQ 60 packet and ProcessingLatency, the time spent by receiver between receipt of ECHO REQ 60 and sending of ECHO RESP 61.

The host 1 will calculate the roundtrip latency as is initialization phase and if the latency is below the maximum acceptable value determined in initialization, host sends the CLOCK SET message 62 to receiver 2 that contains an estimate of hosts clock at the time receiver received the ECHO REQ 61 packet. The estimated time is calculated by adding half of the measured roundtrip time to time of outputting the ECHO REQ 61 packet.

The protocol assumes that the network latency from host to receiver is equal to latency from receiver to host. This is usually the case, but the roundtrip will become unsymmetrical when ECHO REQ is appended to audio data as packet that contains ECHO REQ and audio data is much larger than the response packet that contains only ECHO RESP. This unsymmetry can be compensated by appending extra data to ECHO RESP to make the response packet same size as the request. In real applications, the unsymmetry of network packet sizes does not have very large effect on the actual result of the synchronization. The effect of unsymmetric network latency to offsets between host and receiver clocks can be calculated as follows (for simplicity, the calculation does not include processing latency):
1. Host clock after synchronization will be $Th_1+L_{ht}+L_{th}+L_{ht}$ (=Host time at start+latency of ECHO REQ+latency of ECHO REPLY+latency of CLOCK SET)
2. Receiver clock at the end of synchronization will be $Th_1+(L_{th}+L_{ht})/2+L_{th}+L_{ht}$ (SET CLOCK time+latency of ECHO REPLY+latency of CLOCK SET)

Figure 5:
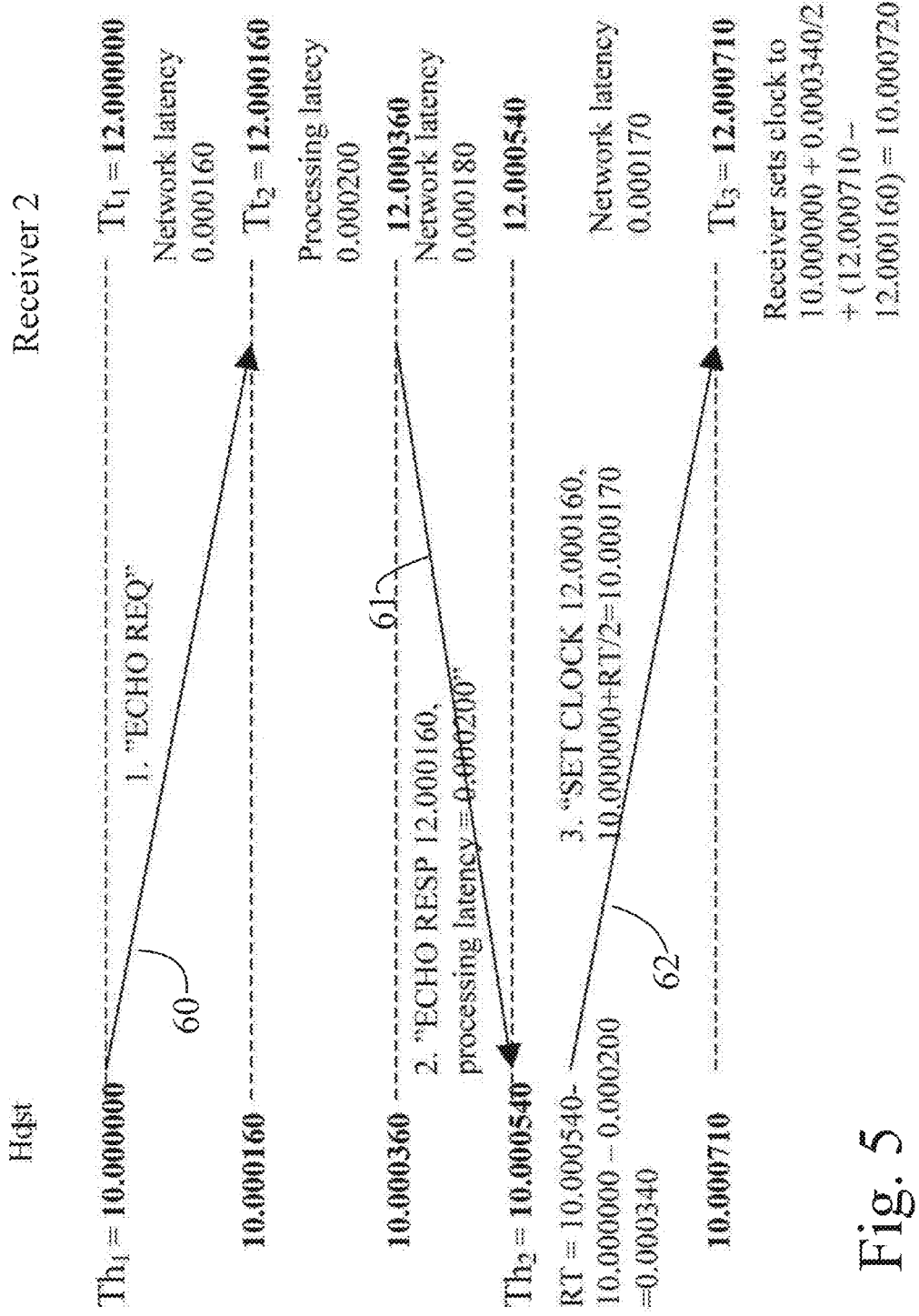
FIG. 5 shows as a timing diagram a method in accordance with the invention.

The difference of clock will be $Th_1+L_{ht}+L_{th}+L_{ht}-(Th_1+(L_{th}+L_{ht})/2+L_{th}+L_{ht})=(L_{th}-L_{ht})/2$ Further in more detail, in accordance with FIG. 5 host and receiver clocks have 2 second offset at host time 10.000000 s ($Th_1$). Synch protocol packet latencies are 0.000160 s from host to receiver ($Th_1$-$Tt_1$) 60, 0.000180 s from receiver to host 61 ($Tt_2$-$Th_2$). This will result in 0.000010 s clock offset at the end of synchronization, assuming that receiver's clock does not significantly drift from host clock between target time 12.000160 and 12.000710. Receiver 2 may also correct frequency of its clock based on the measured offsets and reduce average error between target and host clocks.

Since the network latencies (0.000160 s and 0.000180 s) were not equal, host and target clocks will have offset of (0.000180−0.000160)/2=0.000010 at the end of synchronization ($Tt_3$).

Figure 6:
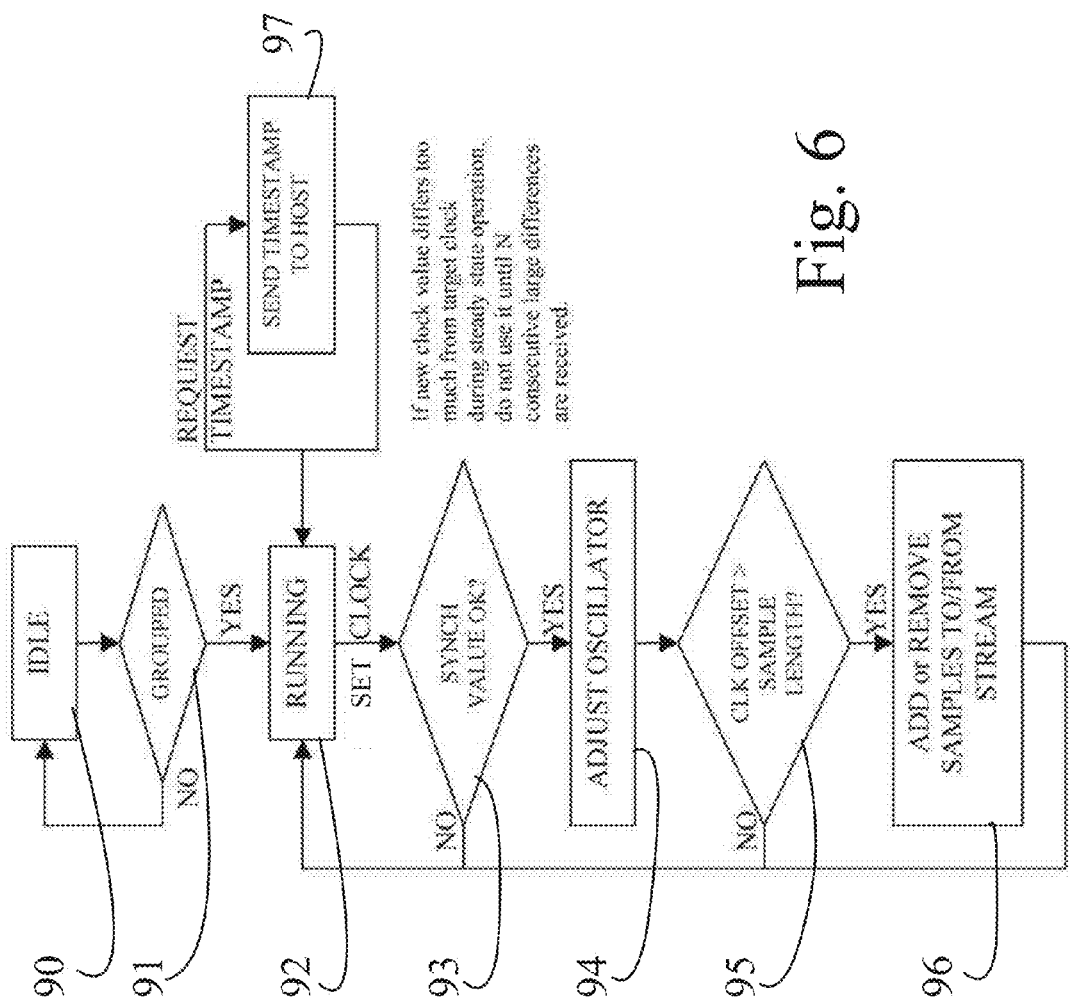
FIG. 6 shows as a flow chart a synchronization protocol in the receiver in accordance with the invention.

In accordance with FIG. 6 at start 90 receiver initializes hardware, possibly acquires IP address via DHCP and enters Idle state. In block 91 the receiver receives SET GROUP command from host. The message contains IP address of multicast group to which all the loudspeaker group related traffic is sent. The message also contains information on which channel of multi-channel audio the receiver is to output to digital-to-analog conversion. Receiver starts to listen to the multicast address. It also sends message to host and acknowledges that the receiver has entered the group. Receiver enters state 92, RUNNING. At running state 92 receiver will receive message directed to loudspeaker group multicast IP address. Audio data is entered into play queue and eventually output to digital-to-analog conversion. If receiver receives REQUEST TIMESTAMP message it enters state 97, SEND TIMESTAMP TO HOST. If receiver receives SET CLOCK message it enters state 93. In block 93 validity of new clock value is determined based on current time, estimate of clock drift between host and receiver and time interval since last SET CLOCK message. If the new value appears invalid (due to large processing latency in host or some other reason), receiver clock is not set and control returns to state 92, RUNNING. If the new clock value appears valid, state 94, ADJUST OSCILLATOR, is entered. Control voltage to adjustable oscillator is set in block 94 based on the measured drift and between host and receiver clocks and the current control voltage. In block 95, if the measured clock offset between receiver and host is less than the duration of specified number of samples, state 92, RUNNING, is entered. In block 96, if the measured clock offset between receiver and host is more than the duration specified number of samples, adjust clock value by multiple of sample durations. At the same time add or remove samples to/from the audio stream to compensate for the clock adjustment. After the adjustment, return to state 92, RUNNING. Further in block 97 is sent TIMESTAMP message containing current receiver clock value and processing latency to host.

Figure 7:
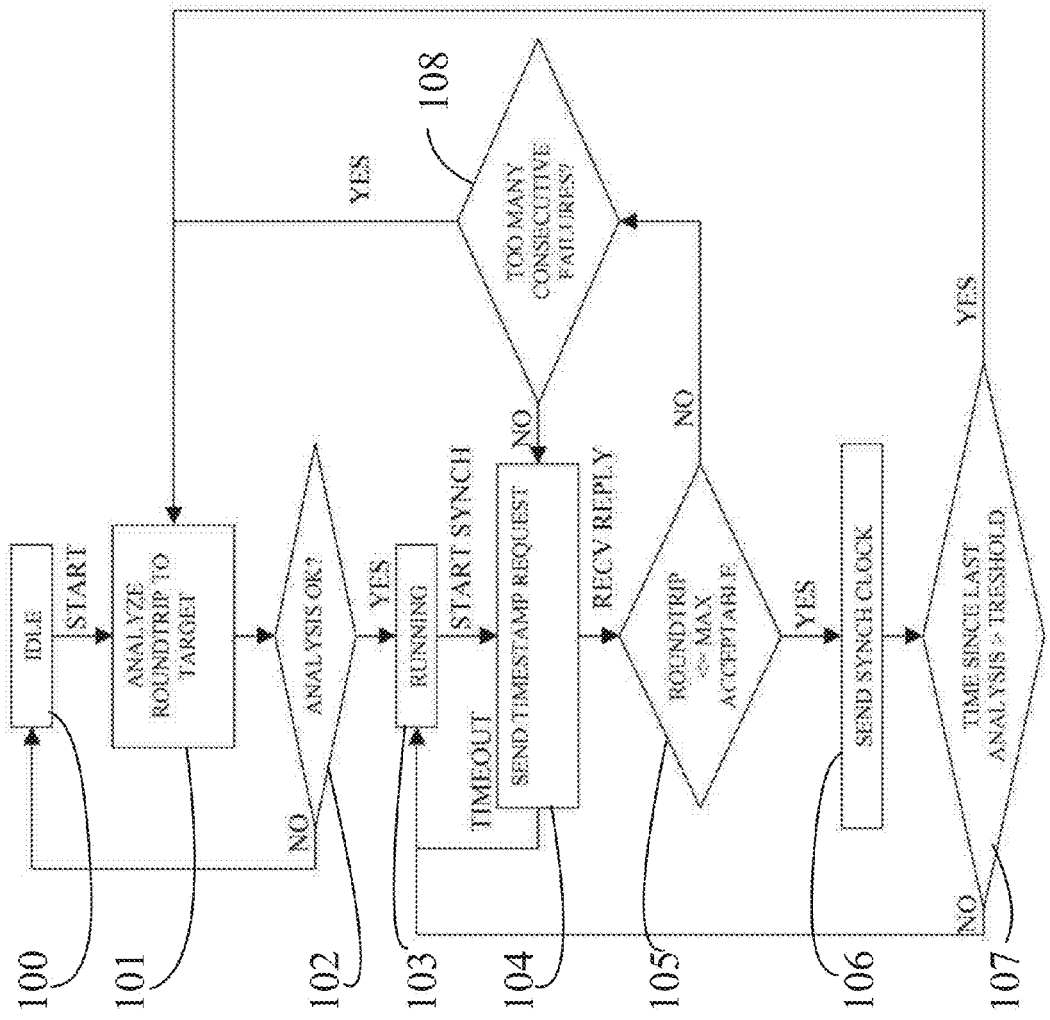
FIG. 7 shows as a flow chart a synchronization protocol in the host in accordance with the invention.

In accordance with FIG. 7, in block 100 host application is started. It queries network for available receiver loudspeakers and enters IDLE state. In block 101 Host application receives command from user interface to setup a receiver loudspeaker group. It starts analyzing network latency to each loudspeaker. In block 102, if analysis was not successful report error to user and return to IDLE state. Analysis may not succeed for example if the packet loss in the network is too large. If analysis of network latencies to each receiver is successful store maximal acceptable synchronization network latency for each receiver and enter state 103, RUNNING.

In running state 103 the system periodically synchronizes receiver loudspeaker clocks. In block 104 timestamp request is sent to receiver. If reply is not received within given period, the system returns to running state and retries the synchronization. If the synchronization fails several times consecutively, the system marks receiver loudspeaker as inactive and removes it from the group of active receivers. If TIMESTAMP is received from receiver, system enters state 105. In block 105 the system determines network latency for the synchronization transaction. If it is above the maximum acceptable synchronization network latency determined in 101, the system enters state 108. If the latency is below acceptable maximum, the system enters to state 106. In state 106 system sends SET CLOCK message to receiver. In block 107, if time since last latency analysis is below given threshold value, the system enters to state 102, RUNNING. If time elapsed since last analysis is too large, the system reanalyzes network latency to receiver to detect if network latency has been permanently reduced by entering to state 101. In block 108, if more than given number of consecutive synchronization transactions have network latency larger than the acceptable maximum, the system performs latency analysis in order to determine permanent growth of network latency.

According to one embodiment of the invention, the proposed synchronization method can principally be utilized also in wireless audio applications, said, wireless loudspeaker systems.

Due to the lower transfer rate and delays introduced by the media access control of standard wireless networks, such as 802.11 a/b/g, the network latencies are considerably larger than in wired 100 Mbps or 1000 Mbps Ethernet networks. The synchronization protocol can adapt to this increased latency as it analyses networks behavior during the setup phase.

Standard wireless networks also introduce random latency in order to prevent collisions during packet transmissions. These random delays make the synchronization in wireless networks more difficult that in Ethernet based wired networks. The effects of said random delays can be reduced by selecting the acceptable maximum network latency using more strict percentage value than when operating in wired networks. If percentage of 30% is used instead of 90%, only transactions with less random delay will be used for clock synchronization. This modification means that each clock synchronization requires on average 3 ECHO REQUEST/ECHO REPLY transactions before acceptable values are acquired for SET CLOCK command.

Wireless networks also typically have much larger packet loss than Ethernet-based wired networks due to radio interference and collisions during packet transmissions. To reduce the effects of packet loss a Forward Error Correction (FEC)—encoding may be used to add redundancy in transmitted audio data. This redundancy may be used by receiver to reconstruct the audio packets lost by the network.

The invention claimed is:

1. A data transfer method in a digital sound reproduction system, said method comprising the steps of;
    generating a digital audio stream for multiple channels in a host data source, the audio stream being formed by multiple consecutive samples,
    receiving the digital audio stream sent by the host data source through a digital data transmission network by several digital receivers each of which including a microcontroller with a clock, the receivers further including means for generating an audio signal out of the digital audio stream,
    initiating synchronization, by the host data source, of the receivers by sending repeatedly a synchronization sample to each of the receivers, wherein each receiver replies to the synchronization sample by a return sample,
    calculating, by the host data source, a latency (T) for each receiver based on the sending time ($Th_1$) of the synchronization sample and the reception time ($Th_2$) of the return sample and a processing time ($Tt_2$-$Tt_1$) of the receiver, which processing time ($Tt_2$-$Tt_1$) is the time the receiver spent between receipt of the synchronization sample and sending of return sample,
    sending, by the host data source, to each receiver information on an estimate of the clock of the host data source at the time the receiver received the synchronization sample,
    adjusting the function of its clock for each receiver based on said information,
    continuously repeating the above synchronization steps,
        wherein the host data source compares the calculated latency (T) with a reference latency and if the calculated latency (T) is larger than the reference latency, no adjustment information is sent to the receiver and the host data source starts a routine to redefine the reference latency.

2. A method according to claim 1, wherein the digital audio stream is transmitted wirelessly to the receiver.

3. A method according to claim 1, wherein the receiver compensates for a clock difference by setting a local clock rate in order to obtain synch of the microcontroller of the receiver.

4. A method according to claim 1, wherein a clock difference is compensated for by adding or removing samples to/from the audio data stream and adjusting clock value accordingly.

5. A data transfer system for a digital sound reproduction system, said data transfer system comprising;
    a host data source for generating a digital audio stream for multiple channels, the audio stream being formed by multiple consecutive samples,
    a transmission path for the host data source,
    multiple digital receivers capable to communicate over the transmission path with the host data source, the receivers including
        a means for receiving the digital audio stream sent by the host data source
        a microcontroller with a clock, and
        a means for generating an audio signal out of the digital audio stream,
    wherein the host data source has means for initiating synchronization of the receivers by sending repeatedly a synchronization sample to each of the receivers,
    wherein each receiver has means for replying to the synchronization sample by a return sample,
    wherein the host data source further includes means for calculating a latency (T) for each receiver based on the sending time ($Th_1$) of the synchronization sample and the reception time ($Th_2$) of the return sample and a processing time ($Tt_2$-$Tt_1$) of the receiver, which processing time ($Tt_2$-$Tt_1$) is the time the receiver spent between receipt of the synchronization sample and sending of return sample,
    sending to the each receiver information on an estimate of the clock of the host data source at the time the receiver received the synchronization sample,
    whereby based on this information each receiver includes means for adjusting the function of its clock,
    the system includes means for repeating the above synchronization steps continuously, and
    wherein the host data source includes means for comparing the calculated latency (T) with a reference latency and if the calculated latency (T) is larger than the reference latency, no adjustment information is sent to the receiver and the host data source starts a routine to redefine the reference latency.

6. A system according to claim 5, wherein the system includes means for transmitting the digital audio stream wirelessly to the receiver.

7. A system according to claim 5, wherein the receiver includes means for compensating for a clock difference by setting a clock frequency of the microcontroller of the receiver.

8. A system according to claim 5, wherein the system includes means for compensating for a clock difference by adding or removing samples to/from the audio stream.

9. A synchronization method in a digital sound reproduction system comprising the steps of:
generating a digital audio stream in a host data source, the audio stream is formed by multiple consecutive samples,
receiving the digital audio stream sent by the host data source through a digital data transmission network by several digital receivers each of which including a microcontroller with a clock, the receivers further including means for generating an audio signal out of the digital audio stream, whereby the receivers are grouped in a predetermined manner,
initiating, by the host data source, synchronization of the receivers of a group by sending repeatedly a synchronization sample to all receivers of a group,
replying, by the receivers of the group, to the synchronization samples by return samples,
calculating, by the host data source, a latency time (T) for each sample and each receiver of the group based on sending time ($Th_1$) of the synchronization sample and the reception time ($Th_2$) of the return sample and a processing time ($Tt_2$-$Tt_1$) of the receiver, which processing time ($Tt_2$-$Tt_1$) is the time the receiver spent between receipt of the synchronization sample and sending of return sample,
statistically forming a reference latency value, by the host data source, based on the calculated latency times (T) and
comparing the calculated latency times (T) with the reference latency value and if the calculated latency (T) is larger than the reference latency value, the host data source starts a routine to redefine the reference latency value.

10. A method according to claim 9, wherein the digital audio stream is transmitted wirelessly to a receiver.

11. A method according to claim 9, wherein the reference latency is set such that at least 80% of the measured and calculated latency values are below the reference latency.

12. A method according to claim 9, wherein the reference latency is set such that at least 50% of the measured and calculated latency values are below the reference latency.

13. A method according to claim 9, further comprising the steps of:
sending a synchronization signal to a receiver,
getting a timestamp, TSsend, for the packet containing the synchronization signal from a timestamp driver,
receiving a return message, comprising receiver ProcessingLatency, which is an amount of microseconds the receiver spent between receipt of the synchronization signal and sending of return message,
getting a timestamp, TSrecv, for the return message packet
calculating Roundtrip latency as TSrecv—TSsend—ProcessingLatency.

* * * * *